Dec. 30, 1947. S. H. EDGE 2,433,443
MEANS FOR CONTROLLING CLUTCH AND BRAKE
MECHANISM OF ROAD AND LIKE VEHICLES
Filed Aug. 3, 1943 3 Sheets-Sheet 1

INVENTOR
Stanley Howard Edge
By
ATTORNEYS

Dec. 30, 1947.   S. H. EDGE   2,433,443
MEANS FOR CONTROLLING CLUTCH AND BRAKE
MECHANISM OF ROAD AND LIKE VEHICLES
Filed Aug. 3, 1943   3 Sheets-Sheet 3

INVENTOR
Stanley Howard Edge
By Marvin L Bateman
ATTORNEYS

Patented Dec. 30, 1947

2,433,443

UNITED STATES PATENT OFFICE 2,433,443

MEANS FOR CONTROLLING CLUTCH AND BRAKE MECHANISM OF ROAD AND LIKE VEHICLES

Stanley Howard Edge, Lincoln, England

Application August 3, 1943, Serial No. 497,266
In Great Britain November 18, 1940

3 Claims. (Cl. 192—12)

This invention relates to differential fluid pressure operated systems for controlling the power driving means on road and like vehicles of the kind having a single control to disengage the clutch and apply the brakes, and has for its object to provide an improved and simplified arrangement in which remote cylinders which operate the clutches or brakes are subjected to a progressive control.

According to the present invention the improved differential fluid pressure operated control system for vehicles comprises a single operating element, a reaction valve actuated by said operating element in which pressure fluid or vacuum is utilised to react against the applied effort and a series of valves adapted to control progressively remote cylinders adapted to disengage clutch components and subsequently apply brakes. On the return movement of the said control lever or pedal the brakes are gradually released and the clutch again gradually takes up the drive. The engagement or disengagement of the clutch or brake mechanism is at all time responsive to the movement imparted to the said control lever to which the required speed of operation is given if quick action is required.

Reference will now be made to the accompanying drawings which illustrate a clutch and brake control device constructed according to the invention and in which:—

Figure 1:
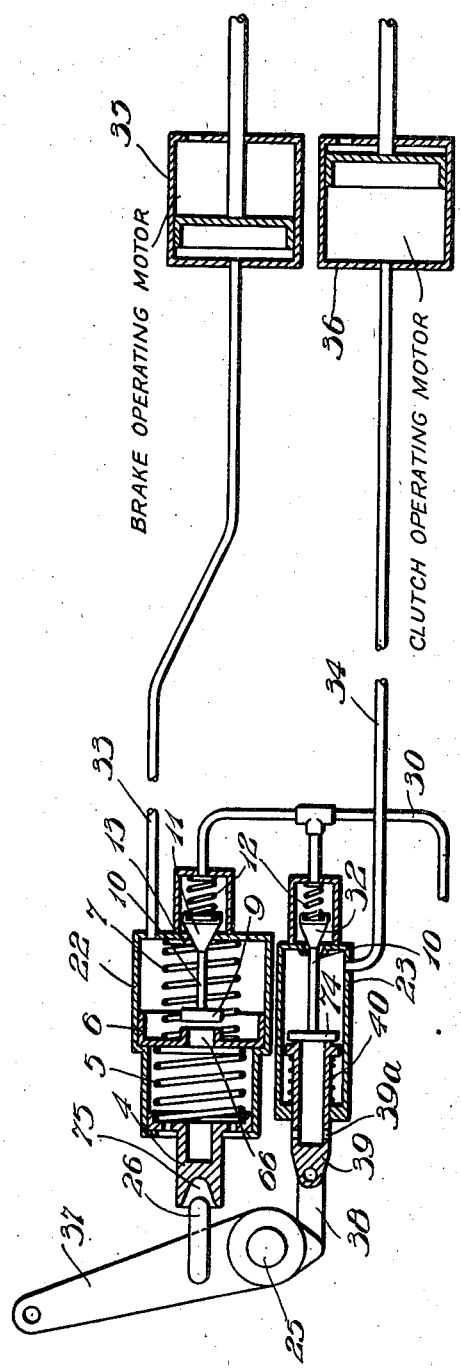
Fig. 1 illustrates diagrammatically a control device according to the present invention.

Referring first to Fig. 1, the pneumatic system for operating clutch and brake mechanism is under the control of a single hand lever 37 which is pivoted at 25 and operates through an arm 26 a reaction valve indicated generally at 22. This reaction valve, which is of standard type, includes a piston 4 which, through the intermediary of a spring 5, bears upon a second piston 6 which operates against the action of a spring 7. The centre of piston 6 is formed as an annular seating 66 on which a valve member 9 is adapted to seat. The valve member 9 is carried by a stem 10 also carrying a second valve member 11 normally urged by a spring 12 on to a seating 13 in which action the spring is assisted by air under pressure from a reservoir which enters the valve housing through a conduit 30.

The casing of the reaction valve 22 is connected by a conduit 33 to a servo cylinder 35 adapted to operate the brake mechanism.

The control mechanism including the hand lever 37 and the reaction valve components is normally held inoperative by the pressure of the air in the conduit 30 which with the assistance of spring 12 holds the valve 11 on its seat.

In operation, movement of the hand lever 37 in a clockwise direction exerts pressure through arm 26 on the piston 4 through a lost motion connection between said arm and a socket 75 in the piston 4 and, when the spring 5 has been sufficiently compressed, on the piston 6 also, to move both pistons towards the right thereby seating valve 9 and forcing the valve 11 off its seat 13 to allow air under pressure to enter the housing of valve 22 and pass by way of conduit 33 to the brake cylinder 35.

The operating arm 37 is connected by means of a link 38 to a valve member 39 forming part of a valve 23 and situated on the side of the pivot 25 opposite to that which carries the arm 26 for operating the brake control reaction valve 22, the housing of valve 23 being connected by a conduit 34 to a clutch operating servo cylinder 36. Valve 23 comprises an inlet valve member 32 which is urged toward closed position by a spring 12, and is connected by a stem 10 to a valve 74 which cooperates with the valve member 39, the latter being acted on by a spring 40.

With the parts in the positions shown in Fig. 1, the air valve 32 is held in the open position so that air under pressure entering by the conduit 30 can pass from the valve housing 23 through conduit 34 to the clutch operating servo cylinder 36 the piston in which is held in the clutch engaged position as shown in this figure. When the hand lever 37 is operated in a clockwise direction, a mechanical pull moves valve member 39 towards the left and compresses spring 40, thereby relieving pressure which holds valve 32 off its seat.

Air valve 32 then seats by the action of air pressure and spring 12 while valve member 39 is disengaged from valve member 74 and the housing 23 is opened to atmosphere through ports 39a to destroy the pressure in servo cylinder 36 and allow the clutch elements to disengage. This operation is timed to take place before the movement of the hand lever 37 is sufficient to operate the reaction valve 22 and admit air under pressure through the conduit 33 to the brake operating servo cylinder 35, due to the lost motion connection between arm 26 and piston 4, and there is sufficient amplitude of movement available to the said hand lever 37 after disengagement of the clutch components to apply varying pressures to cylinder 35 according to whether the brakes are to be used for effecting a gradual retardation of the progress of the vehicle or for stopping it suddenly.

Figure 2:
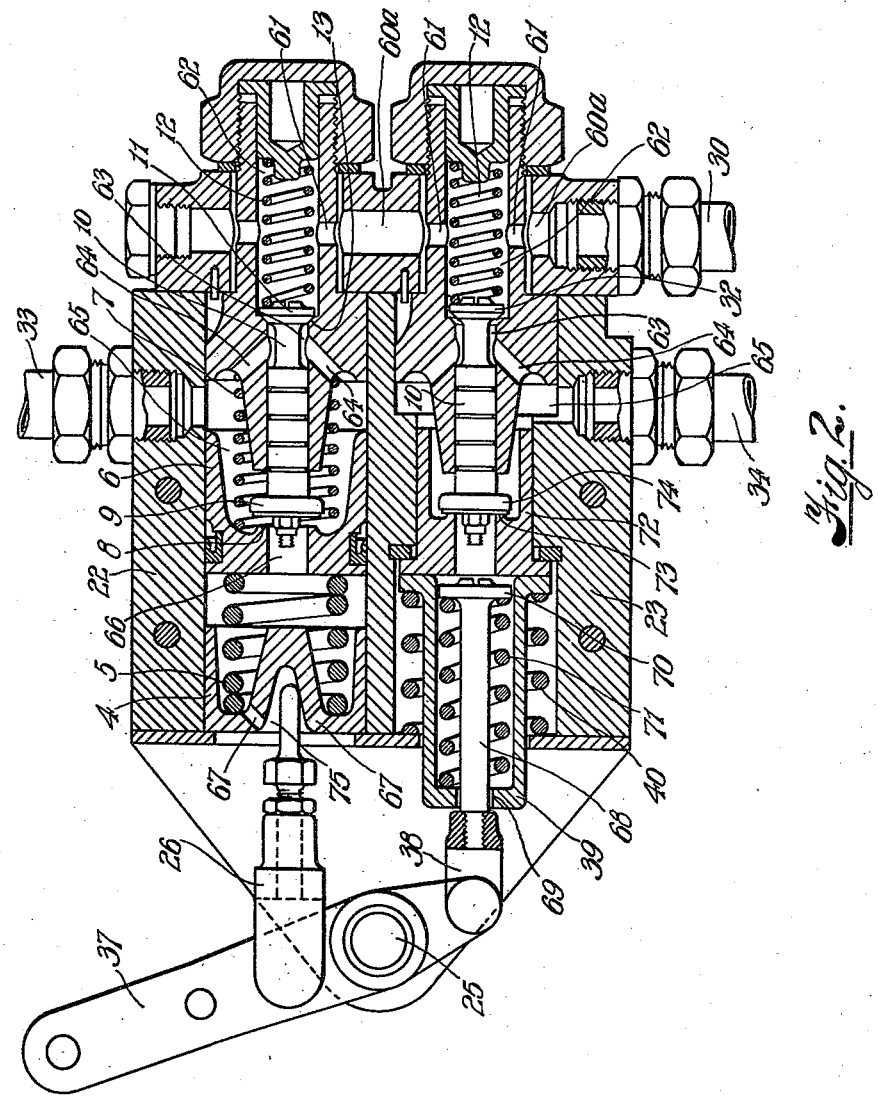
Fig. 2 is a sectional elevation of a valve unit applicable to the arrangement of Fig. 1 and with the parts in the inoperative position.
Figure 3:
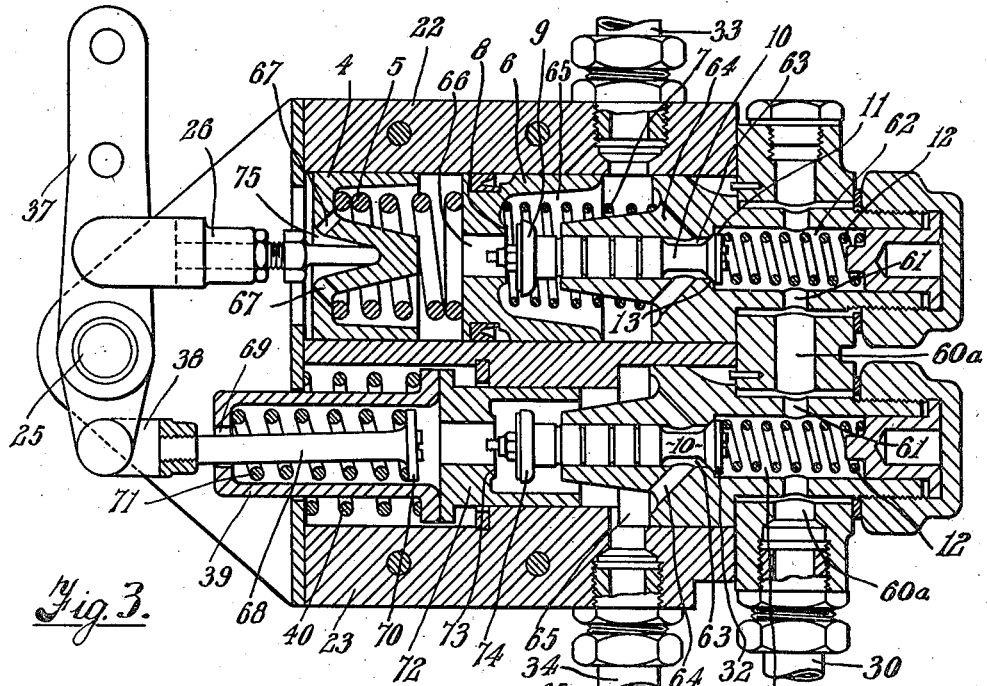
Fig. 3 is a view similar to Fig. 2 with the parts in the position for disengagement of the clutch and Fig. 4 is another view of the valve unit shown in Fig. 2 with the parts in the positions occupied when the brakes are applied.
Figure 4:
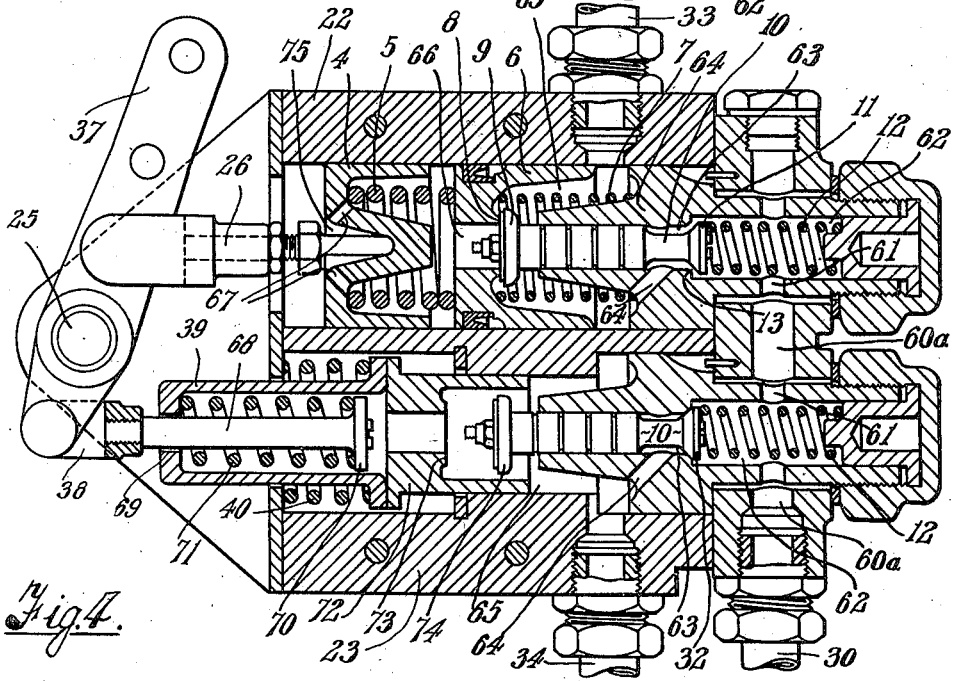

Figs. 2, 3 and 4 show a convenient form of valve unit for carrying out the operations described with reference to the diagram constituting Fig. 1. In Figs. 2, 3 and 4 the parts corresponding to those of Fig. 1 are indicated by corresponding reference numerals. In this valve unit the air under pressure entering by the conduit 30 is distributed through passages 60a and ports 61 to the air valve chambers 62 in which the springs 12 are located. The air valve stems 10 are mounted in passages 63 which communicate by ports 64 with chambers 65 in one of which the spring 7 is located, these chambers being in permanent communication respectively with the conduits 33 and 34. A central passage 66 in the piston 6 communicates with that portion of the housing 22 in which piston 4 is movable and the piston has an air port 67. The arm 38 is connected to a rod 68 which passes freely through an aperture 69 in the outer end of the sleeve 39, the inner end of the rod 68 carrying a flange 70 between which and the outer end of the sleeve a spring 71 is disposed. The sleeve 39 abuts against and is fixed to a sleeve valve 72 having a seating 73 for a valve 74, carried on the stem 10 of the air valve 32.

In Fig. 2 the parts are shown in the inoperative positions, the valve 11 being closed to prevent air under pressure reaching the brake operating cylinder 35 and the valve 32 being open to allow air under pressure to pass to the clutch control cylinder 36 and maintain the clutch members in engagement.

The first stage of operation is illustrated by Fig. 3 wherein the hand lever 37 has been moved in a clockwise direction. This movement has not affected piston 4 or any of the parts constituting the reaction valve 22 but has pulled the sleeves 39 and 72 towards the left and enabled the combined pressure of air and spring 12 to close valve 32. The clutch control cylinder is then open to atmosphere by way of conduit 34, chamber 65, the interiors of sleeves 72 and 39 and the aperture 69 so that the pressure in cylinder 36 is relaxed and the clutch members are disengaged.

The next stage in the operations begins when the hand lever 37 is moved further in a clockwise direction away from the position shown in Fig. 3 as the arm 26, which is self-centering in a recess 75 in the piston 4, pushes the said piston towards the right until the compression of spring 5 causes movement of piston 6 until the valve 9 is seated and the communication is cut off between the conduit 33 and port 67 to atmosphere. The movement of pistons 4 and 6 has also caused the opening of valve 11 to enable air under pressure to pass from chamber 62 through ports 64, chamber 65 and conduit 33 to the cylinder 35 to operate the brakes. The extreme position obtained by this movement is shown in Fig. 4. Between the positions shown in Figs. 3 and 4 the pressure fluid is utilised to react against the effort applied through the hand lever 37 with the result that a grdauated pressure is applied to the brake control cylinder 35, the brakes being only applied completely when the hand lever 37 reaches the extreme position shown in Fig. 4.

In the reverse direction, the brake operating cylinder 35 is opened to atmosphere before the valve 32 is re-opened to admit air under pressure to the cylinder 35 to cause re-engagement of the clutch members.

The invention finds a useful application to the steering of endless track vehicles in which application the mechanism illustrated in Fig. 1 is duplicated and two hand levers are provided one to control the clutch and brake mechanism at each side of the vehicle.

In such an application, the arrangement above described enables the turning movements of the vehicle to be very simply controlled as the initial movement of either hand lever causes disengagement of a clutch and the subsequent movement to apply a graduated pressure to the brake control enables a retardation to be produced whereby a gradual turning movement of the vehicle to right or left results. Alternatively by a sudden movement of the hand lever to full pressure position an immediate right angle turn of the vehicle can be effected. Simultaneous operation of both hand levers will bring the vehicle to a standstill either gradually or suddenly according to the speed of operation of the hand levers.

When the invention is applied to an ordinary wheeled road vehicle a single hand lever can be employed to control the clutch and the brakes on all wheels, any known means being interposed to proportion the braking effort applied between front and rear wheels.

In the embodiment of the invention above described, operation can be effected by utilising a vacuum producing means instead of a source of compressed air, the only adjustment necessary in the arrangements described being the reversal of the connections to the operating cylinders and the valves.

I claim:

1. A control system for vehicles comprising differential fluid pressure operated servomotors for controlling respectively the vehicle clutch and brakes, a single manually operative operating element, and a valve connected to each of said motors for controlling the operation thereof, the valve for the brake controlling motor being reactive under fluid pressure in said motor against the operating effort applied by said operating element, and having a lost motion connection between it and said operating element to effect brake applying operation of the brake controlling servomotor subsequent to operation of the clutch controlling servomotor.

2. A control system according to claim 1, wherein fluid pressure differential in said clutch controlling servomotor normally holds the clutch engaged, and the first stage of movement of said operating element effects variation of said fluid pressure differential to cause clutch disengaging operation of said clutch controlling servomotor.

3. A control system for a driving clutch and the brakes of vehicles, comprising servomotors for controlling such clutch and brakes respectively, a pivoted manually operative operating arm, a valve controlling the operation of said clutch controlling servomotor, and a valve controlling the operation of said brake controlling servomotor, the latter valve being reactive, under the differential fluid pressure in the latter motor, against an operating effort applied thereto, a link connecting the clutch controlling valve to said operating arm at one side of the pivot of said arm for effecting clutch disengaging operation of the clutch controlling motor, and a lost motion connection between the brake controlling valve and said operating arm at the other side of its pivot for operating the latter valve, after clutch disengaging operation of the clutch controlling motor, to effect brake applying operation of the brake controlling motor with a progressive force.

STANLEY HOWARD EDGE.

REFERENCES CITED

The following references are of record in the file of this patent:

UNITED STATES PATENTS

| Number | Name | Date |
| --- | --- | --- |
| 1,399,860 | Green | Dec. 13, 1921 |
| 1,962,857 | Cash | June 12, 1934 |
| 1,994,806 | Barrett | Mar. 19, 1935 |
| 2,266,179 | Ekbom et al. | Dec. 16, 1941 |
| 2,328,606 | Boldt | Sept. 7, 1943 |